US011546117B2

(12) United States Patent
Ang et al.

(10) Patent No.: US 11,546,117 B2
(45) Date of Patent: *Jan. 3, 2023

(54) TECHNIQUES AND APPARATUSES FOR HYBRID AUTOMATIC REPEAT REQUEST ACKNOWLEDGEMENT (HARQ-ACK) FEEDBACK FOR CARRIER AGGREGATION IN NEW RADIO

(71) Applicant: QUALCOMM Incorporated, San Diego, CA (US)

(72) Inventors: Peter Pui Lok Ang, San Diego, CA (US); Wanshi Chen, San Diego, CA (US); Heechoon Lee, San Diego, CA (US); Jing Sun, San Diego, CA (US); Joseph Binamira Soriaga, San Diego, CA (US); Yang Yang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,850

(22) Filed: May 12, 2020

(65) Prior Publication Data

US 2020/0274675 A1 Aug. 27, 2020

Related U.S. Application Data

(63) Continuation of application No. 16/120,909, filed on Sep. 4, 2018, now Pat. No. 10,686,576.

(Continued)

(51) Int. Cl.
*H04L 1/18* (2006.01)
*H04W 72/04* (2009.01)
*H04L 5/00* (2006.01)

(52) U.S. Cl.
CPC .......... *H04L 5/0055* (2013.01); *H04L 1/1864* (2013.01); *H04L 5/0046* (2013.01);
(Continued)

(58) Field of Classification Search
CPC ......... H04W 72/0426; H04W 72/0433; H04W 72/042; H04L 5/0055; H04L 5/0046;
(Continued)

(56) References Cited

U.S. PATENT DOCUMENTS 8,855,027 B2   10/2014 Kim et al.
9,634,985 B2 *  4/2017 Haggar ................... H04L 61/10
(Continued)

FOREIGN PATENT DOCUMENTS

CN       102918793 A  *  2/2013  ........... H04L 1/0041
WO    WO-2012047038 A2 *  4/2012  ........... H04L 1/1607
WO       2017028001 A1     2/2017

OTHER PUBLICATIONS

3GPP TSG RAN WG1 Meeting 90bis R1 **1718622 Prague, GZ, Oct. 9-13, 2017 (Year: 2017).*
(Continued)

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may determine a first hybrid automatic repeat request acknowledgement (HARQ-ACK) payload for a first component carrier (CC) set based at least in part on a first downlink assignment index (DAI). The UE may determine a second HARQ-ACK payload for a second CC set based at least in part on a second DAI. The UE may transmit the first HARQ-ACK payload for the first CC set and the second HARQ-ACK payload for the second CC set. Numerous other aspects are provided.

24 Claims, 8 Drawing Sheets

Related U.S. Application Data

(60) Provisional application No. 62/587,981, filed on Nov. 17, 2017.

(52) U.S. Cl.
CPC ....... *H04W 72/0426* (2013.01); *H04L 1/1812* (2013.01); *H04L 1/1887* (2013.01); *H04W 72/0433* (2013.01)

(58) Field of Classification Search
CPC . H04L 5/0044; H04L 5/0053; H04L 27/2608; H04L 1/1864; H04L 1/1887; H04L 1/1812; H04L 1/1861; H04L 1/1896; H04L 1/1893; H04L 1/189; H04L 1/18; H04L 1/1607
USPC .......................................................... 370/329
See application file for complete search history.

(56) References Cited

U.S. PATENT DOCUMENTS

| | | | |
|---|---|---|---|
| 2013/0322358 A1 | 12/2013 | He et al. | |
| 2014/0078944 A1* | 3/2014 | Yang | H04L 1/0057 |
| | | | 370/280 |
| 2017/0041923 A1 | 2/2017 | Park | |
| 2017/0207895 A1* | 7/2017 | Yang | H04L 1/1822 |
| 2018/0007669 A1 | 1/2018 | Yi et al. | |
| 2018/0084454 A1* | 3/2018 | Takeda | H04W 72/042 |
| 2018/0227885 A1 | 8/2018 | Lee et al. | |
| 2018/0287745 A1* | 10/2018 | Sun | H04L 1/0013 |
| 2018/0302128 A1 | 10/2018 | Akkarakaran et al. | |
| 2018/0332568 A1 | 11/2018 | Wu et al. | |
| 2019/0020445 A1* | 1/2019 | Kim | H04L 1/0071 |
| 2019/0045489 A1* | 2/2019 | He | H04W 72/12 |
| 2019/0149271 A1* | 5/2019 | Yin | H04L 1/1816 |
| | | | 370/329 |
| 2019/0150122 A1* | 5/2019 | Ying | H04W 72/14 |
| | | | 370/329 |
| 2019/0150181 A1* | 5/2019 | Kim | H04L 1/1858 |
| | | | 370/329 |
| 2019/0158250 A1 | 5/2019 | Ang et al. | |
| 2019/0191486 A1* | 6/2019 | Myung | H04W 76/27 |
| 2019/0215128 A1* | 7/2019 | Zhang | H04L 5/001 |
| 2019/0230667 A1 | 7/2019 | Loehr et al. | |
| 2019/0230685 A1* | 7/2019 | Park | H04W 72/0453 |
| 2020/0100139 A1* | 3/2020 | Kim | H04L 1/16 |
| 2020/0374043 A1* | 11/2020 | Lei | H04W 72/0413 |
| 2021/0143945 A1* | 5/2021 | Park | H04L 1/1614 |
| 2021/0176011 A1* | 6/2021 | Lei | H04W 72/042 |

OTHER PUBLICATIONS

International Search Report and Written Opinion—PCT/US2018/049564—ISA/EPO—dated Dec. 5, 2018.

Nokia, et al., "On CBG Based Transmissions", 3GPP Draft; R1-1718622 CBG Based Transmission, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017 (Oct. 8, 2017), 8 Pages, XP051341796, Retrieved from the Internet: URL: http://www.3gpp.org/ftp/Meetings_3GPP_SYNC/RAN1/Docs/ [retrieved on Oct. 8, 2017].

Wilus Inc: "Discussion on HARQ-ACK Multiplexing for NR", 3GPP Draft; R1-1718279_Final, 3rd Generation Partnership Project (3GPP), Mobile Competence Centre; 650, Route Des Lucioles; F-06921 Sophia Antipolis Cedex; France, vol. RAN WG1, No. Prague, CZ; Oct. 9, 2017-Oct. 13, 2017, Oct. 8, 2017 (Oct. 8, 2017), 6 Pages, XP051341461, Retrieved from the Internet: URL: http://www.3gpp.org/ftp/Meetings_3GPP_SYNC/RAN1/Docs/ [retrieved on Oct. 8, 2017].

Taiwan Search Report—TW107131108—TIPO—dated Nov. 5, 2021.

Nokia, et al., "On Remaining Aspects of NR CA/DC and BWPs", 3GPP TSG-RAN WG1 Meeting NRAH #3, R1-1715755, 3GPP, Mobile Competence Centre, 650, Route Des Lucioles; F-06921 Sophia-Antipolis Cedex, France, vol. RAN WG1, No. Nagoya, Japan; Sep. 18, 2017-Sep. 21, 2017, 13 Pages, XP051339217, URL: http://www.3gpp.org/ftp/Meetings_3GPP_SYNC/RAN1/Docs/.

Nokia, et al., "On the Open Aspects of HARQ Management", R1-1715546, 3GPP TSG RAN WG1 NR Ad-Hoc #3, Nagoya, Japan, Sep. 18-21, 2017, 9 Pages.

\* cited by examiner

TECHNIQUES AND APPARATUSES FOR HYBRID AUTOMATIC REPEAT REQUEST ACKNOWLEDGEMENT (HARQ-ACK) FEEDBACK FOR CARRIER AGGREGATION IN NEW RADIO

CROSS-REFERENCE TO RELATED APPLICATIONS UNDER 35 U.S.C. § 119

This application is a continuation of U.S. patent application Ser. No. 16/120,909, filed Sep. 4, 2018, entitled "TECHNIQUES AND APPARATUSES FOR HYBRID AUTOMATIC REPEAT REQUEST ACKNOWLEDGEMENT (HARQ-ACK) FEEDBACK FOR CARRIER AGGREGATION IN NEW RADIO," which claims priority to U.S. Provisional Patent Application No. 62/587,981, filed on Nov. 17, 2017, entitled "TECHNIQUES AND APPARATUSES FOR HYBRID AUTOMATIC REPEAT REQUEST ACKNOWLEDGEMENT (HARQ-ACK) FEEDBACK FOR CARRIER AGGREGATION IN NEW RADIO," which are hereby expressly incorporated by reference herein.

FIELD OF THE DISCLOSURE

Aspects of the present disclosure generally relate to wireless communication, and more particularly to techniques and apparatuses for hybrid automatic repeat request acknowledgement (HARQ-ACK) feedback for carrier aggregation in New Radio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may be performed by a user equipment (UE). The method may include determining a first hybrid automatic repeat request acknowledgement (HARQ-ACK) payload for a first component carrier (CC) set based at least in part on a first downlink assignment index (DAI); determining a second HARQ-ACK payload for a second CC set based at least in part on a second DAI; and transmitting the first HARQ-ACK payload for the first CC set and the second HARQ-ACK payload for the second CC set.

In some aspects, a method of wireless communication may be performed by a user equipment (UE). The method may include determining a first size indicator that indicates a first size of a first hybrid automatic repeat request acknowledgement (HARQ-ACK) payload associated with a first component carrier (CC), wherein the first size is determined based at least in part on a first code block group (CBG) configuration for the first CC; determining a second size indicator that indicates a second size of a second HARQ-ACK payload associated with a second CC, wherein the second size is determined based at least in part on a second CBG configuration for the second CC; transmitting the first size indicator and the second size indicator in a size indicator group; and transmitting the first HARQ-ACK payload and the second HARQ-ACK payload in a HARQ-ACK payload group.

In some aspects, a user equipment for wireless communication may include memory and one or more processors operatively coupled to the memory. The memory and the one or more processors may be configured to determine a first hybrid automatic repeat request acknowledgement (HARQ-ACK) payload for a first component carrier (CC) set based at least in part on a first downlink assignment index (DAI); determine a second HARQ-ACK payload for a second CC set based at least in part on a second DAI; and transmit the first HARQ-ACK payload for the first CC set and the second HARQ-ACK payload for the second CC set.

In some aspects, a user equipment for wireless communication may include memory and one or more processors operatively coupled to the memory. The memory and the one or more processors may be configured to determine a first size indicator that indicates a first size of a first hybrid automatic repeat request acknowledgement (HARQ-ACK) payload associated with a first component carrier (CC), wherein the first size is determined based at least in part on a first code block group (CBG) configuration for the first CC; determine a second size indicator that indicates a second size of a second HARQ-ACK payload associated with a second CC, wherein the second size is determined based at least in part on a second CBG configuration for the second CC; transmit the first size indicator and the second size indicator in a size indicator group; and transmit the first HARQ-ACK payload and the second HARQ-ACK payload in a HARQ-ACK payload group.

In some aspects, a non-transitory computer-readable medium may store one or more instructions for wireless communication. The one or more instructions, when executed by one or more processors of a user equipment, may cause the one or more processors to determine a first hybrid automatic repeat request acknowledgement (HARQ-ACK) payload for a first component carrier (CC) set based at least in part on a first downlink assignment index (DAI); determine a second HARQ-ACK payload for a second CC set based at least in part on a second DAI; and transmit the first HARQ-ACK payload for the first CC set and the second HARQ-ACK payload for the second CC set.

In some aspects, a non-transitory computer-readable medium may store one or more instructions for wireless communication. The one or more instructions, when executed by one or more processors of a user equipment, may cause the one or more processors to determine a first size indicator that indicates a first size of a first hybrid automatic repeat request acknowledgement (HARQ-ACK) payload associated with a first component carrier (CC), wherein the first size is determined based at least in part on a first code block group (CBG) configuration for the first CC; determine a second size indicator that indicates a second size of a second HARQ-ACK payload associated with a second CC, wherein the second size is determined based at least in part on a second CBG configuration for the second CC; transmit the first size indicator and the second size indicator in a size indicator group; and transmit the first HARQ-ACK payload and the second HARQ-ACK payload in a HARQ-ACK payload group.

In some aspects, an apparatus for wireless communication may include means for determining a first hybrid automatic repeat request acknowledgement (HARQ-ACK) payload for a first component carrier (CC) set based at least in part on a first downlink assignment index (DAI); means for determining a second HARQ-ACK payload for a second CC set based at least in part on a second DAI; and means for transmitting the first HARQ-ACK payload for the first CC set and the second HARQ-ACK payload for the second CC set.

In some aspects, an apparatus for wireless communication may include means for determining a first size indicator that indicates a first size of a first hybrid automatic repeat request acknowledgement (HARQ-ACK) payload associated with a first component carrier (CC), wherein the first size is determined based at least in part on a first code block group (CBG) configuration for the first CC; means for determining a second size indicator that indicates a second size of a second HARQ-ACK payload associated with a second CC, wherein the second size is determined based at least in part on a second CBG configuration for the second CC; means for transmitting the first size indicator and the second size indicator in a size indicator group; and means for transmitting the first HARQ-ACK payload and the second HARQ-ACK payload in a HARQ-ACK payload group.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
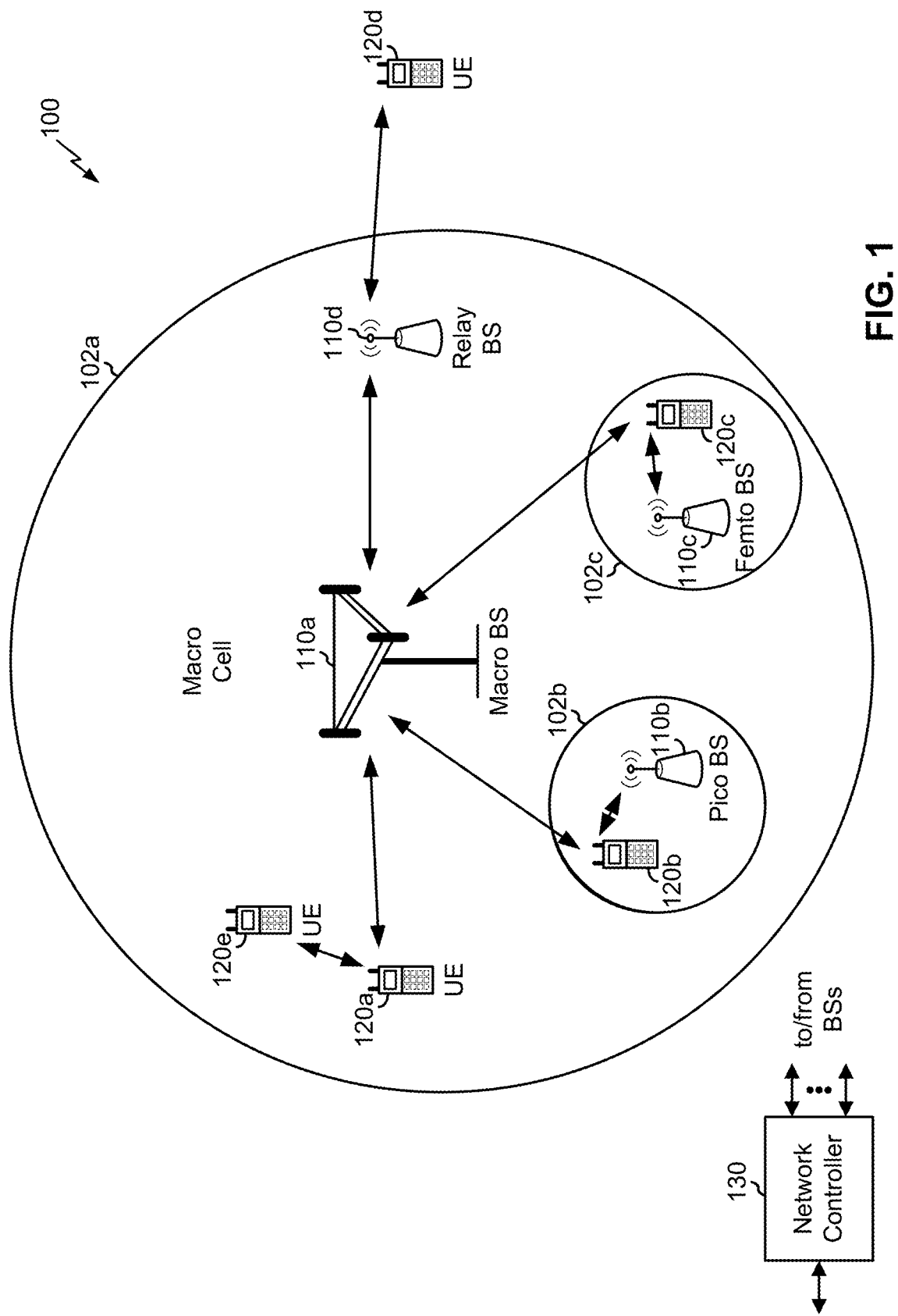
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
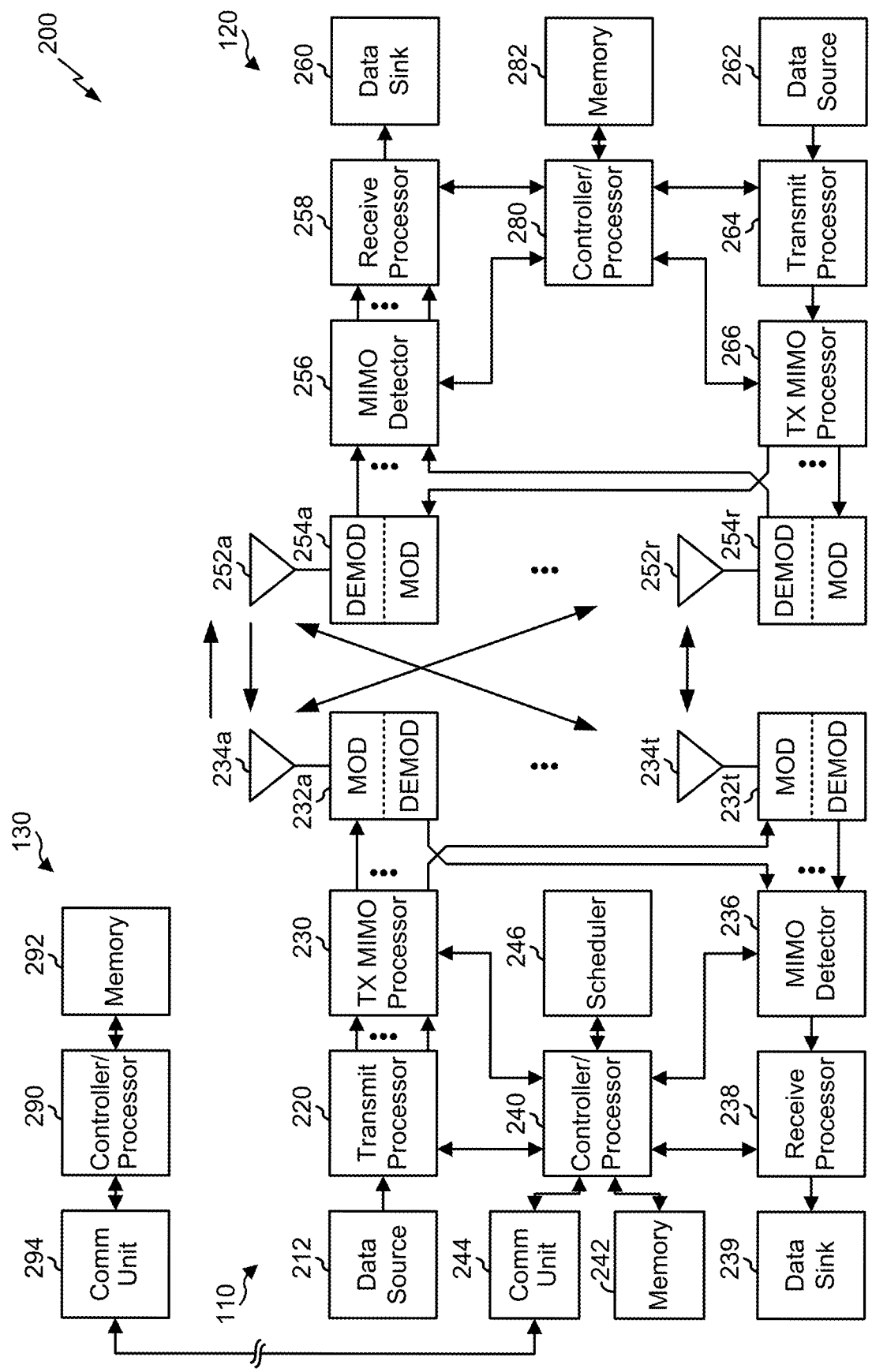
FIG. 2 is a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with HARQ-ACK feedback for carrier aggregation in New Radio, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a first hybrid automatic repeat request acknowledgement (HARQ-ACK) payload for a first component carrier (CC) set based at least in part on a first downlink assignment index (DAI); means for determining a second HARQ-ACK payload for a second CC set based at least in part on a second DAI; means for transmitting the first HARQ-ACK payload for the first CC set and the second HARQ-ACK payload for the second CC set; and/or the like. Additionally, or alternatively, UE 120 may include means for determining a first size indicator that indicates a first size of a first hybrid automatic repeat request acknowledgement (HARQ-ACK) payload associated with a first component carrier (CC), wherein the first size is determined based at least in part on a first code block group (CBG) configuration for the first CC; means for determining a second size indicator that indicates a second size of a second HARQ-ACK payload associated with a second CC, wherein the second size is determined based at least in part on a second CBG configuration for the second CC; means for transmitting the first size indicator and the second size indicator in a size indicator group; means for transmitting the first HARQ-ACK payload and the second HARQ-ACK payload in a HARQ-ACK payload group; and/or the like. In some aspects, such means may include one or more components of UE 120 described in connection with FIG. 2.

As indicated above, FIG. 2 is provided merely as an example. Other examples are possible and may differ from what was described with regard to FIG. 2.

In New Radio, a transport block (TB) may be divided into multiple code block groups (CBGs), where each CBG represents a portion of the transport block for which a receiver sends an individual acknowledgement (ACK) or negative acknowledgement (NACK). For example, if a TB includes 8 CBGs, then a HARQ-ACK payload (e.g., also referred to as HARQ-ACK feedback) for the TB may include 8 bits, one for each CBG in the TB. The bits carried in a single CBG are acknowledged or negatively acknowledged as a group, and bits in different CBGs are acknowledged or negatively acknowledged separately. In this way, if a large-sized TB experiences a failure in a small number of bits, individual CBGs that include those bits can be retransmitted instead of retransmitting the entire TB, thereby conserving network resources.

In some cases, different component carriers (CCs), used for carrier aggregation, may have different CBG configurations. For example, a first CC may have CBGs enabled (e.g., may use per-CBG HARQ-ACK payload), and a second CC may have CBGs disabled (e.g., may use per-TB HARQ-ACK payload). Furthermore, when CBGs are enabled, different CCs may use different numbers of CBGs per TB. This may make decoding and/or interpretation of HARQ-ACK payload difficult, as it may be unclear which bits of the HARQ-ACK payload correspond to which CBGs and/or TBs, especially when all HARQ-ACK payload is transmitted via a single CC (e.g., a primary CC) and/or using a single channel (e.g., a physical uplink control channel (PUCCH) and/or a physical uplink shared channel (PUSCH)), as is often the case.

In some cases, devices communicating using carrier aggregation may determine the maximum number of bits that could be included in an instance of HARQ-ACK payload, and may include that maximum number of bits in all instances of HARQ-ACK payload across all CCs. For example, if a first CC has CBGs disabled and has a HARQ-ACK payload size of 1 bit, and a second CC has CBGs enabled and has a HARQ-ACK payload size of 8 bits, then the devices may use a HARQ-ACK payload size of 8 bits on both the first CC and the second CC. However, this may result in wasted bits (e.g., 7 wasted bits per HARQ-ACK payload on the first CC) and high overhead, thereby reducing efficiency of network communications. Some techniques and apparatuses described herein conserve network resources used for HARQ-ACK payloads in carrier aggregation when different CCs have different CBG configurations.

Figure 3:
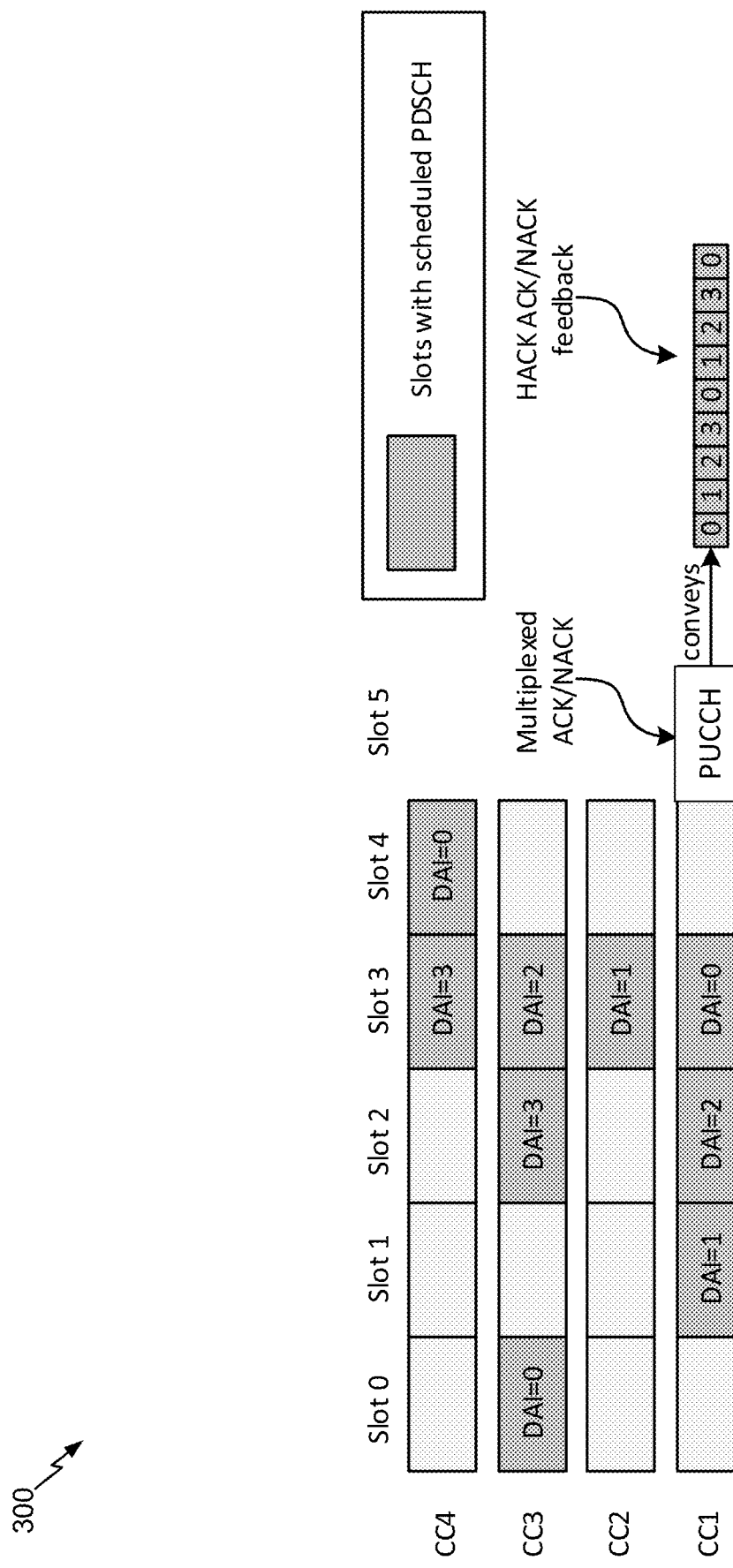
FIGS. 3 and 4 are diagrams illustrating examples of using downlink assignment indexes for HARQ-ACK feedback, in accordance with various aspects of the present disclosure.

FIG. 3 is a diagram illustrating an example 300 of using downlink assignment indexes for HARQ-ACK feedback, in accordance with various aspects of the present disclosure.

In LTE, the concept of a downlink assignment index (DAI) has been proposed to solve the many-to-one mapping problem of HARQ ACK/NACK feedback. Specifically, the DAI is designed to alleviate the ambiguity between the base station 110 and the UE 120 regarding the total size and index of scheduled TBs in a single PUCCH transmission. Two DCI fields are introduced: a DAI counter (sometimes referred to herein as cumulative DAI) and a total DAI value, each with two bits. As illustrated in FIG. 3, the DAI counter accumulates in a frequency first and time second fashion. The UE 120 treats missing values in an observed DAI sequence as missing a grant and reports NACK in the PUCCH feedback. With a 2-bit modulo-4 DAI counter, the scheme is robust to any consecutive three missing grants, and with a 2-bit total DAI field, the issue of PUCCH payload size ambiguity caused by missing the last few grants is alleviated.

NR presents several challenges in the design of a robust HARQ-ACK feedback mechanism, one of them being that the number of CBGs for each downlink assignment could be different, leading to potentially different ACK/NACK payload sizes across slots/CCs.

As indicated above, FIG. 3 is provided as an example. Other examples are possible and may differ from what was described with respect to FIG. 3.

Figure 4:
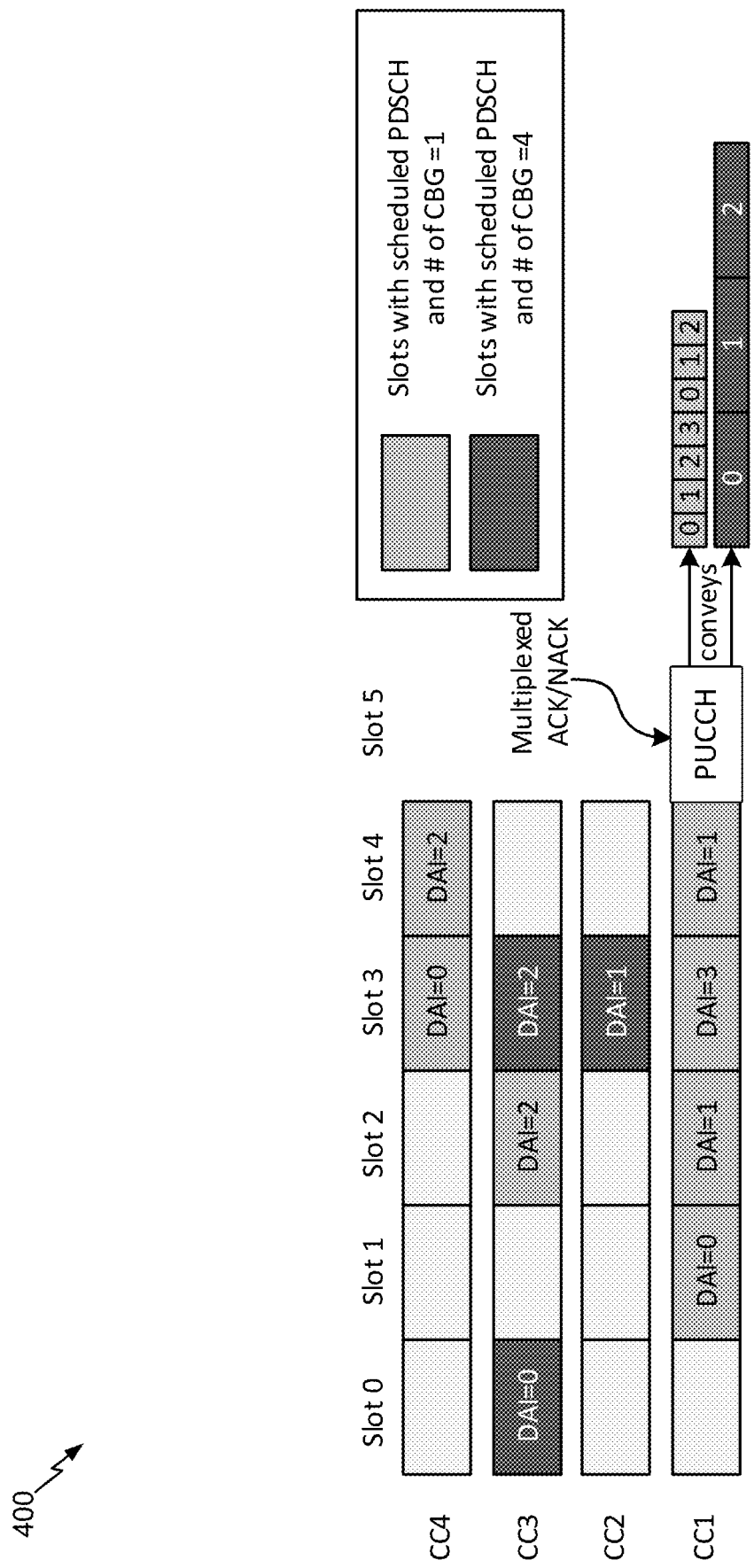

FIG. 4 is a diagram illustrating another example 400 of using downlink assignment indexes for HARQ-ACK feedback, in accordance with various aspects of the present disclosure.

NR supports CBG based retransmission, where the number of CBGs can be RRC configured. With LTE's DAI design, even though the UE 120 can detect missing grants, the UE 120 cannot infer the expected ACK/NACK payload size for the missing grants. To solve this issue, techniques and apparatuses described herein use multiple DAI instances, one for each ACK/NACK payload size.

FIG. 4 illustrates the multiple DAI instance proposal, where CC1 and CC4 are configured with TB-based retransmission, and CC2 and CC3 are configured with CBG-based retransmission with the number of CBGs per TB equal to 4. Note that slot 2 in CC3 is labeled as TB-based because the base station 110 may use fallback DCI for a particular slot to indicate TB-based transmission even though the component carrier has CBGs enabled by default.

As indicated above, FIG. 4 is provided as an example. Other examples are possible and may differ from what was described with respect to FIG. 4.

Figure 5:
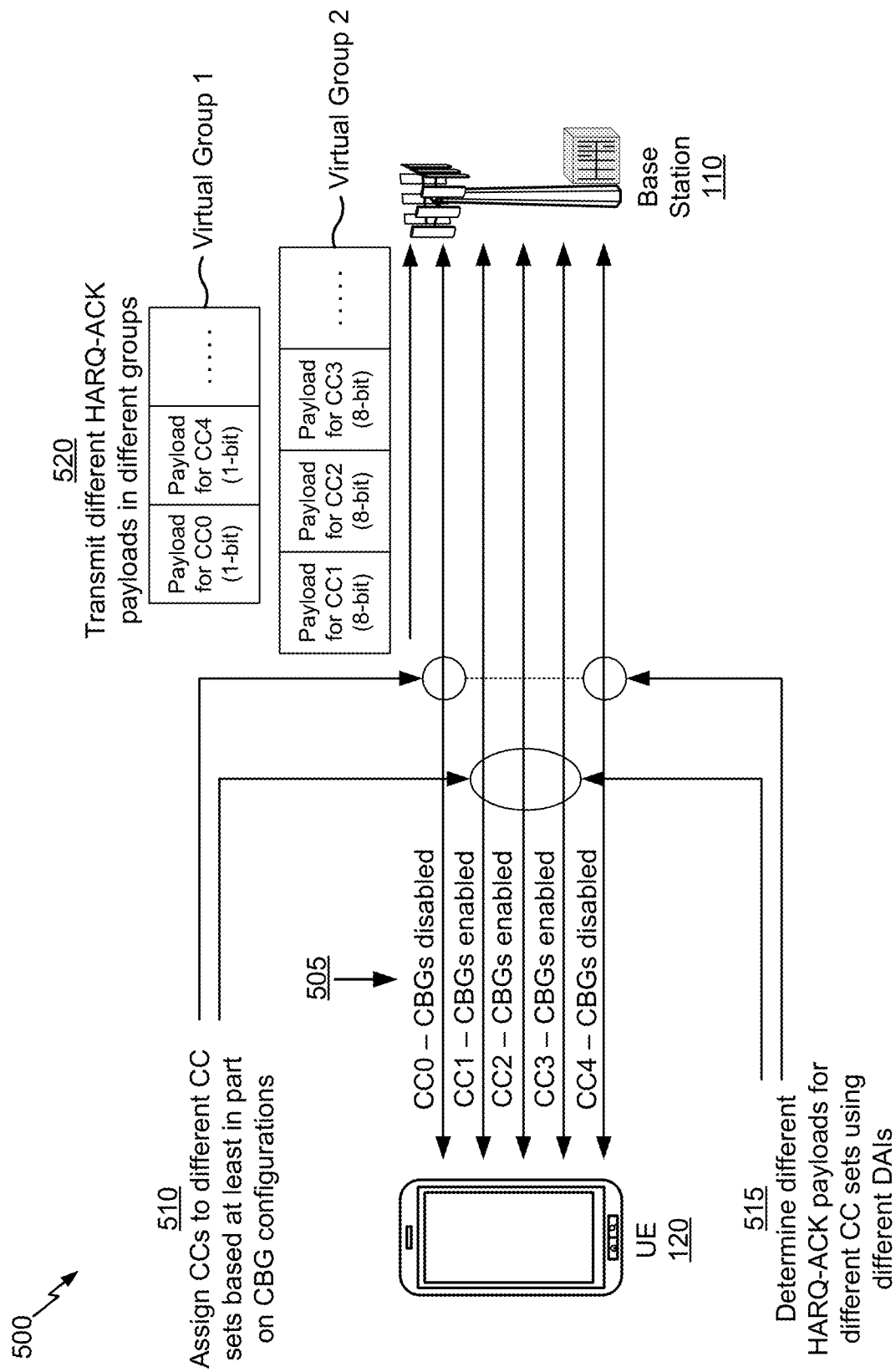
FIG. 5 is a diagram illustrating an example of HARQ-ACK feedback for carrier aggregation in New Radio, in accordance with various aspects of the present disclosure.

FIG. 5 is a diagram illustrating an example 500 of HARQ-ACK feedback for carrier aggregation in New Radio, in accordance with various aspects of the present disclosure.

As shown in FIG. 5, a UE 120 and a base station 110 may communicate using carrier aggregation, with five components carriers (CCs) shown as an example (e.g., CC0, CC1, CC2, CC3, and CC4). In some aspects, different CCs may have different CBG configurations. For example, one CC may have CBGs enabled (e.g., may use per-CBG HARQ-ACK payload), and another CC may have CBGs disabled (e.g., may use per-TB HARQ-ACK payload). As an example, and as shown by reference number 505, CBGs may be disabled on CC0 and CC4, and CBGs may be enabled on CC1, CC2, and CC3. Furthermore, when CBGs are enabled, different CCs may use different numbers of CBGs per TB.

As shown by reference number 510, the UE 120 may assign different CCs to different CC sets when the CCs have different CBG configurations. For example, one or more first CCs having CBGs disabled, such as CC0 and CC4, may be assigned to a first CC set, and one or more second CCs having CBGs enabled, such as CC1, CC2, and CC3, may be assigned to a second CC set. In some aspects, a CC may correspond to a downlink data allocation (e.g., a physical downlink shared channel (PDSCH) allocation), and a CC set may correspond to a per-slot, per-CC downlink data allocation.

In some aspects, the UE 120 may determine a CBG configuration for a CC based at least in part on a default or semi-static CBG configuration for the CC. In some aspects, the default or semi-static CBG configuration may be signaled to the UE 120, by the base station 110, in a radio resource control (RRC) configuration message, in a system information block (SIB), and/or the like.

In some aspects, the UE 120 may determine a CBG configuration for a CC based at least in part on a dynamic CBG configuration for the CC. In some aspects, the dynamic CBG configuration may be signaled to the UE 120, by the base station 110, in downlink control information (DCI), such as a downlink grant and/or the like. In some aspects, the dynamic CBG configuration may override the default or semi-static CBG configuration. For example, a CC may have CBGs enabled by default, but a downlink grant may instruct the UE 120 to disable CBGs for one or more downlink assignments indicated in the downlink grant. In some aspects, DCI that instructs the UE 120 to disable CBGs may be referred to as fallback DCI.

In some aspects, the assignment of CCs to CC sets may apply for a particular transmission time interval (TTI) and/or a particular set of TTIs. In some aspects, the TTI may be a slot, a subframe, a frame, and/or the like. For example, because a CBG configuration of a CC may be overridden for one or more downlink assignments in one or more slots, the CBG configuration for a CC may change across different slots. Thus, CCs may be assigned to CC sets for particular slots.

In some aspects, the UE 120 may assign CCs to CC sets based at least in part on a determination that at least one CC, to be used by the UE 120 for carrier aggregation, has CBGs enabled. Additionally, or alternatively, the UE 120 may assign CCs to CC sets based at least in part on a determination that at least two CCs, to be used by the UE 120 for carrier aggregation, have different CBG configurations. For example, if all CCs used by the UE 120 have the same CBG configuration (e.g., CBGs are disabled for all CCs, all CCs use 8 CBGs per TB, and/or the like), then there may not be a need to assign CCs to different CC sets.

As shown by reference number 515, the UE 120 may determine different HARQ-ACK payloads for different CC sets using different downlink assignment indexes (DAIs) corresponding to the different CC sets. For example, a first DAI may be used to count a number of downlink assignments for the UE 120 on first CC(s) included in the first CC set, and a second DAI may be used to count a number of downlink assignments for the UE 120 on second CC(s) included in the second CC set. The UE 120 may determine a first HARQ-ACK payload for the first CC set using the first DAI to identify downlink assignments on the first CC set that were successfully received by the UE 120 and/or to identify downlink assignments on the first CC set that were not successfully received by the UE 120. Similarly, the UE 120 may determine a second HARQ-ACK payload for the second CC set using the second DAI to identify downlink assignments on the second CC set that were successfully received by the UE 120 and/or to identify downlink assignments on the second CC set that were not successfully received by the UE 120.

For example, the UE 120 may use the respective DAIs to generate respective HARQ-ACK payloads for the different CCs. Each bit of HARQ-ACK payload for a CC set may indicate whether a particular CBG was successfully received on the CC set (e.g., in the case where CBGs are enabled for the CC set) or may indicate whether a particular TB was successfully received on the CC set (e.g., in the case where CBGs are disabled for the CC set).

In some aspects, the DAI (e.g., the first DAI and the second DAI) may include a cumulative DAI (e.g., first cumulative DAI and second cumulative DAI). A cumulative DAI may include a counter, included in each downlink assignment (e.g., downlink grant), that is incremented by the base station 110 for each downlink assignment scheduled for the UE 120. Thus, the cumulative DAI may indicate a number of HARQ-ACK payloads that are to be transmitted by the UE 120. In some aspects, the base station 110 may indicate the last two bits (e.g., the two least significant bits) of the DAI to the UE 120 in DCI (e.g., in a downlink grant). In some aspects, such as in time division duplexing (TDD), the cumulative DAI may be incremented in a frequency-first (e.g., per frequency resource) time-second (e.g., per time resource) manner. In some aspects, such as in frequency division duplexing (FDD), the cumulative DAI may be incremented per carrier index. In this case, the base station 110 and the UE 120 may use different counters to keep track of a number of downlink assignments scheduled for the UE 120 on different CC sets.

In some aspects, the DAI (e.g., the first DAI and the second DAI) may include a total DAI (e.g., first total DAI and second total DAI). A total DAI may indicate a number of scheduled downlink assignments across serving cells up to the current TTI (e.g., slot, subframe, and/or the like). Thus, the total DAI may indicate a number of HARQ-ACK payloads that are to be transmitted by the UE 120.

As shown by reference number 520, the UE 120 may transmit, and the base station 110 may receive, the different HARQ-ACK payloads, corresponding to the different CC sets, in different groups. For example, the UE 120 may transmit a first HARQ-ACK payload, corresponding to the first CC set and generated using the first DAI, in a first group, and may transmit a second HARQ-ACK payload, corresponding to the second CC set and generated using the second DAI, in a second group.

As an example, and as shown, a first group of bits may include a payload for CC0 and a payload for CC4, which are both included in the first CC set with CBGs disabled. In this case, since CBGs are disabled, the size of each HARQ-ACK payload is one bit (e.g., one bit for each TB). As further shown, a second group of bits may include a payload for CC1, a payload for CC2, and a payload for CC3, which are all included in the second CC set with CBGs enabled. In this case, CBGs are enabled with a configuration of 8 CBGs per TB, so the size of each HARQ-ACK payload is 8 bits (e.g., one bit for each of the 8 CBGs in a TB).

In some aspects, the UE 120 may separately concatenate HARQ-ACK payloads corresponding to different CC sets (e.g., to form separate HARQ-ACK payload groups), and may then concatenate all HARQ-ACK payloads together for transmission to the base station 110. In some aspects, the UE 120 may apply DAI padding to a HARQ-ACK payload group prior to concatenation with other HARQ-ACK payload groups. For example, the UE 120 may apply DAI padding to form a HARQ-ACK payload group of a particular size (e.g., a size corresponding to a multiple of M grants, such as M=4).

For example, the UE 120 may concatenate first HARQ-ACK payload for a first CC set (e.g., for multiple CCs in the first CC set) to form a first HARQ-ACK payload group, and may separately concatenate second HARQ-ACK payload for the second CC set (e.g., for multiple CCs in the second CC set) to form a second HARQ-ACK payload group. The UE 120 may then concatenate bits of the first HARQ-ACK payload group with bits of the second HARQ-ACK payload group with one another. In some aspects, prior to concatenating the bits of the first HARQ-ACK payload group with the bits of the second HARQ-ACK payload group, the UE 120 may apply DAI padding to the bits of the first HARQ-ACK payload group and/or the bits of the second HARQ-ACK payload group (e.g., according to one or more DAI padding rules).

In some aspects, the base station 110 may use the first DAI to determine the number of HARQ-ACK payloads that are included in the first group, and may use the second DAI to determine the number of HARQ-ACK payloads that are included in the second group, thereby creating a clear correspondence between bits of HARQ-ACK payload and corresponding CBGs and/or TBs and reducing decoding errors, while conserving network resources used for HARQ-ACK payloads in carrier aggregation when different CCs have different CBG configurations (e.g., as compared to using a maximum HARQ-ACK payload size across all CCs).

While two groups of HARQ-ACK payloads are shown as an example, in some aspects, more than two groups may be used. For example, different numbers of CBGs per TB may be used across different CCs. For example, a set of CCs may use 2 CBGs per TB, 8 CBGs per TB, 16 CBGs per TB, and/or the like. In this case, CCs with different numbers of CBGs per TB may be assigned to different CC sets that use different DAIs. Different HARQ-ACK payload (e.g., of different sizes, such as 2 bits, 8 bits, 16 bits, and/or the like) may be generated using the different DAIs, and may be grouped separately by the UE 120 for transmission to the base station 110.

Furthermore, while some aspects are described herein with respect to assigning CCs to different CC sets based at least in part on the CCs having different CBG configurations, in some aspects, the CCs may be assigned to different CC sets for a different reason. For example, a first CC set may include one or more CCs served by a first base station 110, and a second CC set may include one or more CCs served by a second base station 110. In this case, a single base station 110 may not be able to communicate using all CCs, so separate DAIs may be maintained for the different CC sets.

As indicated above, FIG. 5 is provided as an example. Other examples are possible and may differ from what was described with respect to FIG. 5.

Figure 6:
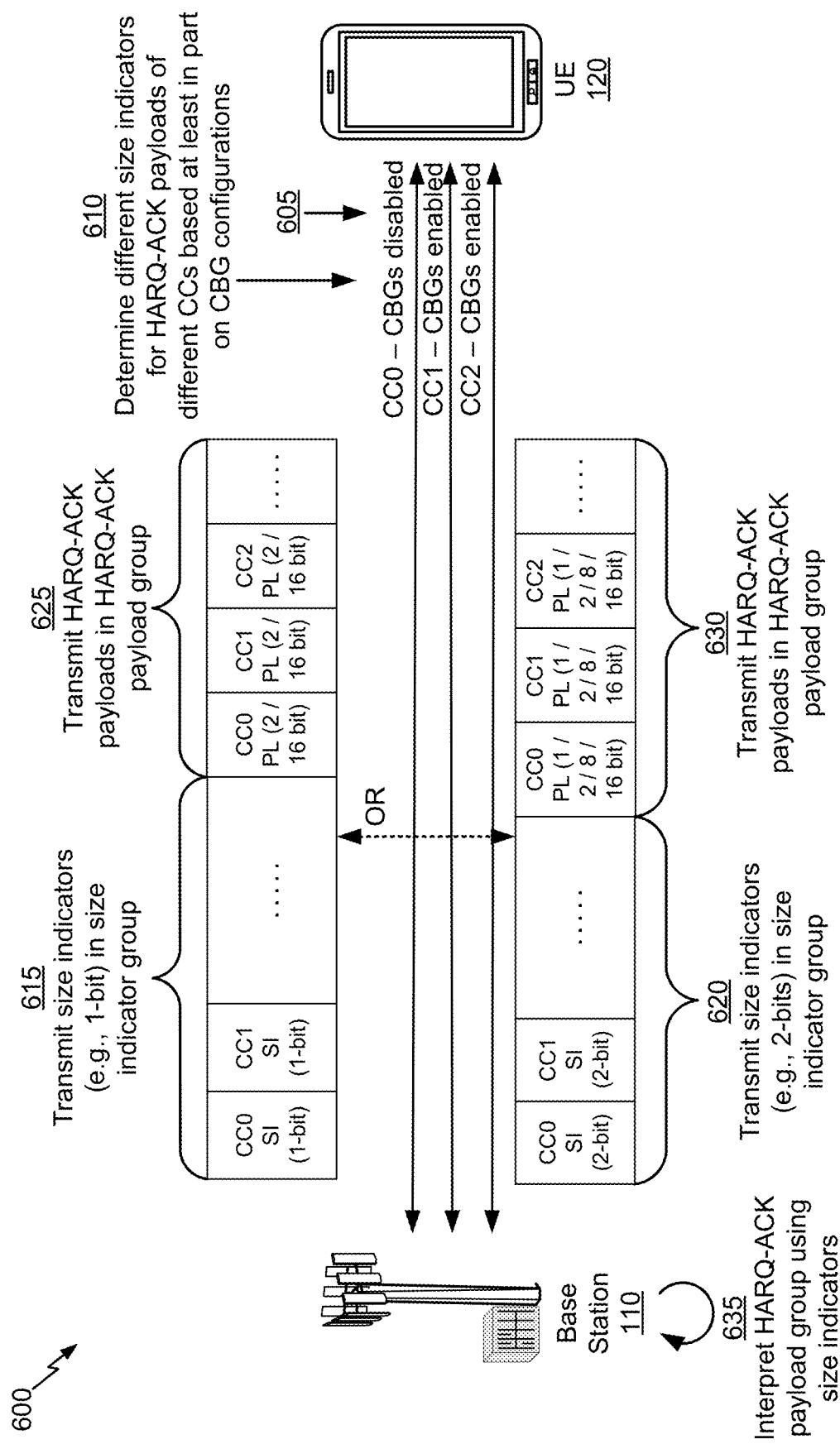
FIG. 6 is a diagram illustrating another example of HARQ-ACK feedback for carrier aggregation in New Radio, in accordance with various aspects of the present disclosure.

FIG. 6 is a diagram illustrating another example 600 of HARQ-ACK feedback for carrier aggregation in New Radio, in accordance with various aspects of the present disclosure.

As shown in FIG. 6, a UE 120 and a base station 110 may communicate using carrier aggregation, with three components carriers (CCs) shown as an example (e.g., CC0, CC1, and CC2). As described above in connection with FIG. 5, different CCs may have different CBG configurations. For example, one CC may have CBGs enabled (e.g., may use per-CBG HARQ-ACK payload), and another CC may have CBGs disabled (e.g., may use per-TB HARQ-ACK payload). Furthermore, when CBGs are enabled, different CCs may use different numbers of CBGs per TB. As an example, and as shown by reference number 605, CBGs may be disabled on CC0, and CBGs may be enabled on CC1 and CC2.

As shown by reference number 610, the UE 120 may determine different size indicators for HARQ-ACK payloads of different CCs when the CCs have different CBG configurations. In some aspects, the UE 120 may determine a CBG configuration for a CC based at least in part on a semi-static (e.g., default) and/or dynamic CBG configuration for the CC, and/or may determine a CBG configuration for a CC for a particular set of TTIs, as described above in connection with FIG. 5. A size indicator for a CC may indicate a size of a HARQ-ACK payload for the CC, which may depend on a CBG configuration for the CC. For example, a CC with CBGs disabled may have a HARQ-ACK payload of one bit, a CC that uses two CBGs per TB may have a HARQ-ACK payload of two bits, a CC that uses eight CBGs per TB may have a HARQ-ACK payload of eight bits, a CC that uses sixteen CBGs per TB may have a HARQ-ACK payload of sixteen bits, and/or the like.

In some aspects, the UE 120 may determine different size indicator values for different size indicators only if the corresponding CCs have different CBG configurations. Thus, if a first CC and a second CC have the same CBG configuration (e.g., both have CBGs disabled, or both have CBGs enabled with the same number of CBGs per TB), then a first size indicator for the first CC may have the same value as a second size indicator for the second CC. Additionally, or alternatively, the UE 120 may use a maximum size of HARQ-ACK payloads across all CCs as a size for all HARQ-ACK payloads for all CCs.

For example, the UE 120 may determine a first size indicator that indicates a first size of a first HARQ-ACK payload associated with a first CC, such as CC0. In some aspects, the UE 120 may determine the first size indicator based at least in part on a first CBG configuration associated with the first CC. In this case, since CBGs are disabled for CC0, the size indicator may indicate a size of one bit for HARQ-ACK payload associated with CC0.

As another example, the UE 120 may determine a second size indicator that indicates a second size of a second HARQ-ACK payload associated with a second CC, such as CC1. In some aspects, the UE 120 may determine the second size indicator based at least in part on a second CBG configuration associated with the second CC. In this case, since CBGs are enabled for CC0, the size indicator may indicate a size of, for example, two bits, eight bits, sixteen bits, and/or the like for HARQ-ACK payload associated with CC1, depending on the number of CBGs used per TB on CC1 (e.g., two eight, sixteen, and/or the like). The UE 120 may determine a third size indicator for the third CC in a similar manner as the second CC. While three CCs are shown as an example, in some aspects, a different number of CCs may be used for carrier aggregation of communications between the base station 110 and the UE 120.

As shown by reference numbers 615 and 620, the UE 120 may combine the size indicators to form a size indicator group, and may transmit the size indicator group to the base station 110. Similarly, as shown by reference numbers 625 and 630, the UE 120 may combine the HARQ-ACK payloads to form a HARQ-ACK payload group, and may transmit the HARQ-ACK payload group to the base station 110. Reference number 615 shows an example of a one bit size indicator (shown as SI), which is capable of differentiating between two different sizes of HARQ-ACK payload (shown as PL), as shown by reference number 625 (e.g., 2 bits or 16 bits). Reference number 620 shows an example of a two bit size indicator, which is capable of differentiating between four different sizes of HARQ-ACK payload, as shown by reference number 630 (e.g., 1 bit, 2 bits, 8 bits, or 16 bits).

In some aspects, the UE 120 may separately encode the size indicator group and the HARQ-ACK payload group. Additionally, or alternatively, the UE 120 may transmit the size indicator group before the HARQ-ACK payload group. In this way, as shown by reference number 635, the base station 110 may interpret bits of the HARQ-ACK payload group based at least in part on first decoding bits of the size indicator group.

For example, and referring to reference numbers 615 and 625 where the size indicator is one bit in length, if the first bit of the size indicator group (e.g., which corresponds to CC0) has a value of 0, then the base station 110 may determine that the first HARQ-ACK payload, corresponding to CC0, is 2 bits in length. Similarly, if the second bit of the size indicator group (e.g., which corresponds to CC1) has a value of 1, then the base station 110 may determine that the second HARQ-ACK payload, corresponding to CC1, is 16 bits in length. The base station may make similar determinations regarding the size of HARQ-ACK payloads corresponding to different CCs using the size indicators included in the size indicator group. In this way, the base station 110 may properly interpret HARQ-ACK feedback and reduce errors.

As indicated above, FIG. 6 is provided as an example. Other examples are possible and may differ from what was described with respect to FIG. 6.

Figure 7:
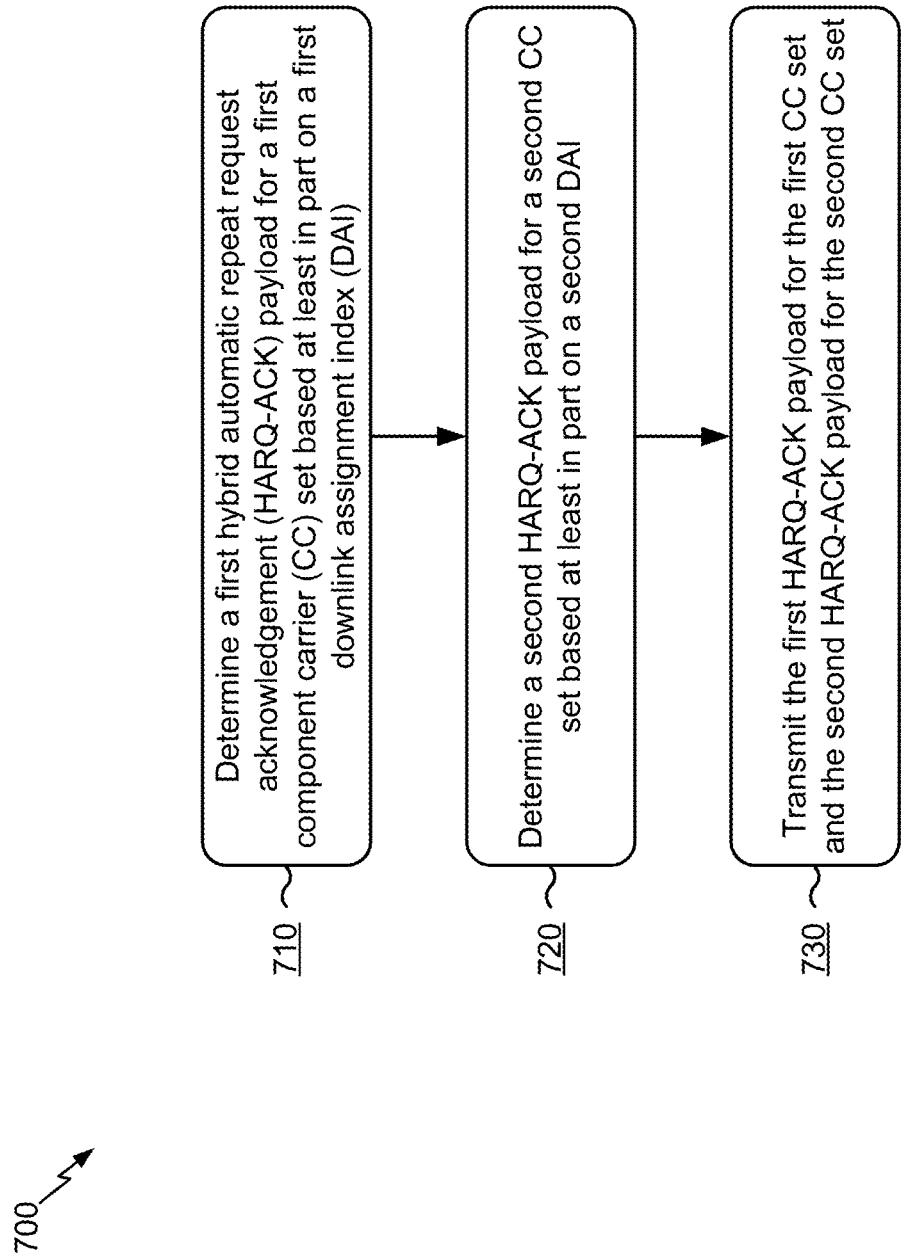
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations relating to HARQ-ACK feedback for carrier aggregation in New Radio.

As shown in FIG. 7, in some aspects, process 700 may include determining a first hybrid HARQ-ACK payload for a first CC set based at least in part on a first DAI (block 710). For example, the UE (e.g., using controller/processor 280 and/or the like) may determine a first hybrid HARQ-ACK payload for a first CC set based at least in part on a first DAI, as described above in connection with FIG. 5.

As further shown in FIG. 7, in some aspects, process 700 may include determining a second HARQ-ACK payload for a second CC set based at least in part on a second DAI (block 720). For example, the UE (e.g., using controller/processor 280 and/or the like) may determine a second hybrid HARQ-ACK payload for a second CC set based at least in part on a second DAI, as described above in connection with FIG. 5. In some aspects, the second DAI may be different from the first DAI.

As further shown in FIG. 7, in some aspects, process 700 may include transmitting the first HARQ-ACK payload for the first CC set and the second HARQ-ACK payload for the second CC set (block 730). For example, the UE (e.g., using controller/processor 280, transmit processor 264, TX MIMO processor 266, MOD 254, antenna 252, and/or the like) may transmit the first HARQ-ACK payload for the first CC set and the second HARQ-ACK payload for the second CC set, as described above in connection with FIG. 5.

Process 700 may include additional aspects, such as any single aspect or any combination of aspects described below and/or in connection with one or more processes described herein.

In some aspects, one or more first CCs included in the first CC set are associated with a first code block group (CBG) configuration, and one or more second CCs included in the second CC set are associated with a second CBG configuration that is different from the first CBG configuration. In some aspects, the first CBG configuration is a configuration where CBGs are enabled and the second CBG configuration is a configuration where CBGs are disabled.

In some aspects, at least one CC is assigned to the first CC set or the second CC set based at least in part on a semi-static CBG configuration for the at least one CC. In some aspects, at least one CC is assigned to the first CC set or the second CC set based at least in part on a dynamic CBG configuration, for the at least one CC, indicated in downlink control information. In some aspects, the downlink control information is fallback downlink control information that overrides a default or semi-static code block group configuration. In some aspects, one or more first CCs are assigned to the first CC set and one or more second CCs are assigned to the second CC set for a particular transmission time interval. In some aspects, one or more first CCs are assigned to the first CC set and one or more second CCs are assigned to the second CC set based at least in part on a determination that CBGs are enabled for at least one CC of the UE.

In some aspects, the first DAI is a first cumulative DAI and the second DAI is a second cumulative DAI. In some aspects, the first DAI is a first total DAI and the second DAI is a second total DAI.

In some aspects, the first HARQ-ACK payload for the first CC set is concatenated in a first HARQ-ACK payload group and the second HARQ-ACK payload for the second CC set is concatenated in a second HARQ-ACK payload group. In some aspects, the first HARQ-ACK payload group and the second HARQ-ACK payload group are concatenated with one another for transmission. In some aspects, at least one of the first HARQ-ACK payload group or the second HARQ-ACK payload group is padded with DAI padding prior to concatenation with one another.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
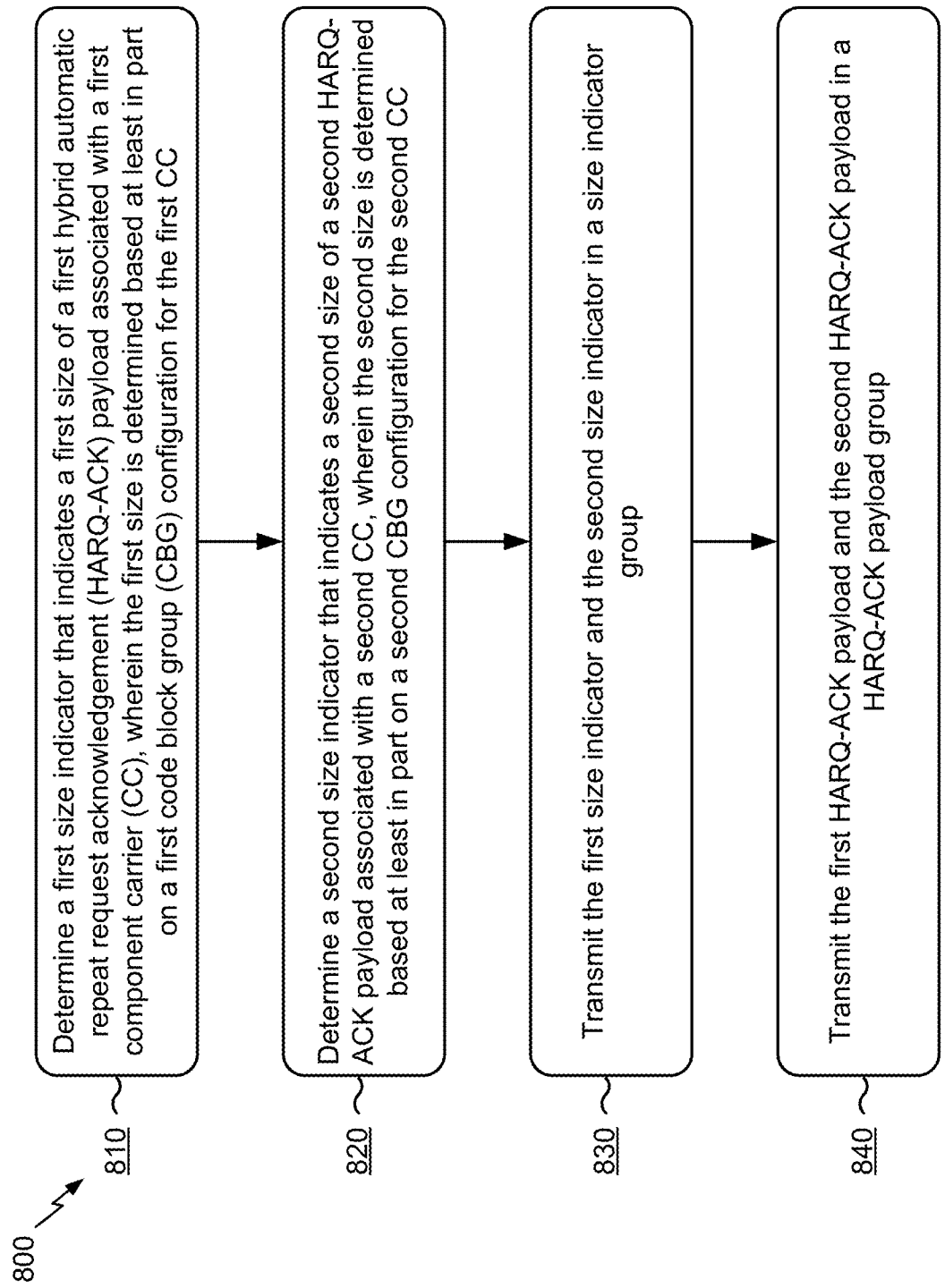
FIG. 8 is a diagram illustrating another example process performed, for example, by a user equipment, in accordance with various aspects of the present disclosure.

FIG. 8 is a diagram illustrating another example process 800 performed, for example, by a UE, in accordance with various aspects of the present disclosure. Example process 800 is an example where a UE (e.g., UE 120 and/or the like) performs operations relating to HARQ-ACK feedback for carrier aggregation in New Radio.

As shown in FIG. 8, in some aspects, process 800 may include determining a first size indicator that indicates a first size of a first HARQ-ACK payload associated with a first CC, wherein the first size is determined based at least in part on a first CBG configuration for the first CC (block 810). For example, the UE (e.g., using controller/processor 280 and/or the like) may determine a first size indicator that indicates a first size of a first HARQ-ACK payload associated with a first CC, as described above in connection with FIG. 6. In some aspects, the first size is determined based at least in part on a first CBG configuration for the first CC.

As further shown in FIG. 8, in some aspects, process 800 may include determining a second size indicator that indicates a second size of a second HARQ-ACK payload associated with a second CC, wherein the second size is determined based at least in part on a second CBG configuration for the second CC (block 820). For example, the UE (e.g., using controller/processor 280 and/or the like) may determine a second size indicator that indicates a second size of a second HARQ-ACK payload associated with a second CC, as described above in connection with FIG. 6. In some aspects, the second size is determined based at least in part on a second CBG configuration for the second CC.

As further shown in FIG. 8, in some aspects, process 800 may include transmitting the first size indicator and the second size indicator in a size indicator group (block 830). For example, the UE (e.g., using controller/processor 280, transmit processor 264, TX MIMO processor 266, MOD 254, antenna 252, and/or the like) may transmit the first size indicator and the second size indicator in a size indicator group, as described above in connection with FIG. 6.

As further shown in FIG. 8, in some aspects, process 800 may include transmitting the first HARQ-ACK payload and the second HARQ-ACK payload in a HARQ-ACK payload group (block 840). For example, the UE (e.g., using controller/processor 280, transmit processor 264, TX MIMO processor 266, MOD 254, antenna 252, and/or the like) may transmit the first HARQ-ACK payload and the second HARQ-ACK payload in a HARQ-ACK payload group, as described above in connection with FIG. 6.

Process 800 may include additional aspects, such as any single aspect or any combination of aspects described below and/or in connection with one or more processes described herein.

In some aspects, the size indicator group is encoded separately from the HARQ-ACK payload group. In some aspects, the size indicator group is transmitted before the HARQ-ACK payload group. In some aspects, decoded bits of the HARQ-ACK payload group are interpreted based at least in part on decoded bits of the size indicator group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a first hybrid automatic repeat request acknowledgement (HARQ-ACK) payload of a first size, for a first component carrier (CC) set, based at least on a first downlink assignment index (DAI);
   determining a second HARQ-ACK payload of a second size, for a second CC set, based at least on a second DAI, wherein the second size is different from the first size;
   transmitting a first size indicator that indicates the first size of the first HARQ-ACK payload and a second size indicator that indicates the second size of the second HARQ-ACK payload; and
   transmitting the first HARQ-ACK payload for the first CC set and the second HARQ-ACK payload for the second CC set, wherein the first HARQ-ACK payload is concatenated in a first HARQ-ACK payload group and the second HARQ-ACK payload is concatenated in a second HARQ-ACK payload group.

2. The method of claim 1, wherein one or more first CCs included in the first CC set are associated with a first code block group (CBG) configuration, and wherein one or more second CCs included in the second CC set are associated with a second CBG configuration that is different from the first CBG configuration.

3. The method of claim 2, wherein the first CBG configuration is a configuration where CBGs are enabled and the second CBG configuration is a configuration where CBGs are disabled.

4. The method of claim 1, wherein at least one CC is assigned to the first CC set or the second CC set based at least on a semi-static code block group configuration for the at least one CC.

5. The method of claim 1, wherein at least one CC is assigned to the first CC set or the second CC set based at least on a dynamic code block group configuration, for the at least one CC, indicated in fallback downlink control information that overrides a default or semi-static code block group configuration.

6. The method of claim 1, wherein one or more first CCs are assigned to the first CC set and one or more second CCs are assigned to the second CC set for a particular transmission time interval.

7. The method of claim 1, wherein one or more first CCs are assigned to the first CC set and one or more second CCs are assigned to the second CC based at least on a determination that code block groups are enabled for at least one CC of the UE.

8. The method of claim 1, wherein the first DAI is a first cumulative DAI and the second DAI is a second cumulative DAI.

9. The method of claim 1, wherein the first DAI is a first total DAI and the second DAI is a second total DAI.

10. The method of claim 1, wherein the first HARQ-ACK payload group and the second HARQ-ACK payload group are concatenated with one another for transmission.

11. The method of claim 10, wherein at least one of the first HARQ-ACK payload group or the second HARQ-ACK payload group is padded with DAI padding prior to concatenation with one another.

12. The method of claim 1, wherein the first size is one of 2 bits, 8 bits, or 16 bits.

13. The method of claim 1, where the first size is based on a code block group (CBG) configuration for the first CC set.

14. A user equipment (UE) for wireless communication, comprising:
memory; and
one or more processors, operatively coupled to the memory, configured to:
determine a first hybrid automatic repeat request acknowledgement (HARQ-ACK) payload of a first size, for a first component carrier (CC) set, based at least on a first downlink assignment index (DAI);
determine a second HARQ-ACK payload of a second size, for a second CC set, based at least on a second DAI, wherein the second size is different from the first size;
transmit a first size indicator that indicates the first size of the first HARQ-ACK payload and a second size indicator that indicates the second size of the second HARQ-ACK payload; and
transmit the first HARQ-ACK payload for the first CC set and the second HARQ-ACK payload for the second CC set, wherein the first HARQ-ACK payload is concatenated in a first HARQ-ACK payload group and the second HARQ-ACK payload is concatenated in a second HARQ-ACK payload group.

15. The UE of claim 14, wherein one or more first CCs included in the first CC set are associated with a first code block group (CBG) configuration, and wherein one or more second CCs included in the second CC set are associated with a second CBG configuration that is different from the first CBG configuration.

16. The UE of claim 15, wherein the first CBG configuration is a configuration where CBGs are enabled and the second CBG configuration is a configuration where CBGs are disabled.

17. The UE of claim 14, wherein at least one CC is assigned to the first CC set or the second CC set based at least on at least one of:
a semi-static code block group configuration for the at least one CC,
a dynamic code block group configuration, for the at least one CC, indicated in fallback downlink control information that overrides the semi-static code block group configuration, or
a combination thereof.

18. The UE of claim 14, wherein one or more first CCs are assigned to the first CC set and one or more second CCs are assigned to the second CC set for a particular transmission time interval.

19. The UE of claim 14, wherein one or more first CCs are assigned to the first CC set and one or more second CCs are assigned to the second CC set based at least on a determination that code block groups are enabled for at least one CC of the UE.

20. The UE of claim 14, wherein the first DAI includes at least one of a first cumulative DAI or a first total DAI, and wherein the second DAI includes at least one of a second cumulative DAI or a second total DAI.

21. The UE of claim 14, wherein the first HARQ-ACK payload group and the second HARQ-ACK payload group are concatenated with one another for transmission.

22. The UE of claim 21, wherein at least one of the first HARQ-ACK payload group or the second HARQ-ACK payload group is padded with DAI padding prior to concatenation with one another.

23. The UE of claim 14, wherein the first size is one of 2 bits, 8 bits, or 16 bits.

24. The UE of claim 14, where the first size is based on a code block group (CBG) configuration for the first CC set.

* * * * *